United States Patent [19]

Seko et al.

[11] Patent Number: 4,692,798

[45] Date of Patent: Sep. 8, 1987

[54] APPARATUS AND PROCESS FOR IMPROVING VISIBILITY OF OBJECT WITHIN VISUAL FIELD

[75] Inventors: Yasutoshi Seko, Yokohama; Yuichi Abe, Yokosuka, both of Japan

[73] Assignee: Nissan Motor Company, Limited, Yokohama, Japan

[21] Appl. No.: 689,243

[22] Filed: Jan. 7, 1985

[30] Foreign Application Priority Data

Jan. 9, 1984 [JP] Japan .................................. 59-1717
Jan. 9, 1984 [JP] Japan .................................. 59-1719

[51] Int. Cl.$^4$ ........................ H04N 7/18; H04N 5/225
[52] U.S. Cl. ..................................... 358/93; 358/228; 250/461.1; 350/331 R
[58] Field of Search ................. 340/50, 81 R, 84, 902, 340/904; 358/93, 108, 213, 228; 362/61, 64, 321; 356/23-26; 252/582; 350/330, 331 R

[56] References Cited

U.S. PATENT DOCUMENTS 3,663,814  5/1972  Madsen ............................ 250/461.1
4,491,390  1/1985  Tong-Shen ..................... 350/331 R
4,561,731  12/1985  Kley ................................. 350/331 R

FOREIGN PATENT DOCUMENTS 1176179   8/1964  Fed. Rep. of Germany ...... 358/228
49-72830  7/1974  Japan .
52-101526 8/1977  Japan .

*Primary Examiner*—Howard W. Britton
*Assistant Examiner*—John K. Peng
*Attorney, Agent, or Firm*—Schwartz, Jeffery, Schwaab, Mack, Blumenthal & Evans

[57] ABSTRACT

An apparatus for improving the visibility of objects within the visual field of a vehicle driver and a process therefor are disclosed. The apparatus includes a light caster casting intense visible light toward a reflective object at a frequency no lower than critical fusion frequency, an image pickup device picking up an image of the object and outputting corresponding image data, an image data amplifier, a picture signal generator and a display. The image data are processed to yield a picture signal which yields a clear picture of the object on the display. The apparatus can give the driver of a vehicle a clear picture of the objects within forward visual field of the vehicle at night without dazzling the drivers of vehicles in the opposite lane.

16 Claims, 18 Drawing Figures

APPARATUS AND PROCESS FOR IMPROVING VISIBILITY OF OBJECT WITHIN VISUAL FIELD

BACKGROUND OF THE INVENTION

1. Field of the Invention

The present invention relates to an apparatus and process for improving the visibility of objects within a visual field and in particular to an apparatus and process for use in an automotive vehicle under adverse optical conditions.

2. Description of the Prior Art

Currently, the most common method of improving the visibility of objects within a forward visual field of an automotive vehicle during night driving is to increase the intensity of light cast by the headlights. However, the intensified headlights tend to dazzle the drivers of vehicles in the opposite lane.

Japanese published unexamined patent application No. 49-72830 discloses a system for reducing the transmission of intensified headlight cast by an automotive vehicle in the opposite lane through a vehicular windshield by means of an optical filter with adjustable transmissivity e.g., a liquid crystal panel and an electronic circuit for controlling the transmissivity of the optical filter. However, since this system darkens the forward visual field of the vehicle on which the headlight is incident, at the moment the optical filter transmissivity is reduced, the driver of the filtering vehicle may fail to recognize pedestrians, etc. crossing or standing in the road within the forward visual field.

Japanese published unexamined patent application No. 52-101526 also discloses a system for shutting out the headlight cast by a vehicle in the opposite lane. However, this system is less effective in cases where the vehicle in the opposite lane lacks the same polarizing filters or plates as are used on one's own vehicle.

Generally, it is known that, when an object is illuminated stroboscopically at a low frequency, an observer will see a flickering image of the illuminant, but if the on-off frequency of the illuminant is increased to a certain value, the observer will have a steady image of the illuminant. With reference to human eyesight, this effect is quanitized in Talbot-Plateau's law:

$$L_m = \frac{1}{t} \int_0^t L(t)dt$$

wherein $L_m$ is steady luminance with time and $L(t)$ is varying luminance with time. In addition, the critical fusion frequency (hereinafter refer to as CFF) at which an observer will perceive a steady image of the illuminant can be derived from Ferry-Porter's law as follows:

$$CFF = a \log L_m + b$$

wherein a and b are constants.

SUMMARY OF THE INVENTION

One consequence of Talbot-Plateau's law is that it is possible to cast visible light at a high intensity toward the driver of a vehicle in the opposite lane at a frequency higher than the CFF without dazzling the driver.

An object of this invention is to provide an apparatus for improving the visibility of objects within a visual field.

Another object of this invention is to provide an apparatus for improving the visibility of objects within a forward visual field of a vehicle at night. In order to achieve these objects, the apparatus of this invention includes a light caster casting intensified visible light toward a reflective object at a frequency higher than critical fusion frequency, an image pickup device, e.g., a solid state image sensor or photomultiplier, for picking up an image of the object and outputting corresponding image data, and an image data amplifier. The image data are processed to yield a picture signal which yields a clearer picture of the object on a display.

A further object of this invention is to provide an apparatus for improving the visibility of objects within a visual field which can filter out optical noise and particularly prevent blooming in a solid state image sensor serving as an image pickup means. In order to achieve this object, the apparatus of this invention includes a light caster casting intensified visible light stroboscopically at a frequency equal to or higher than the critical fusion frequency toward a reflective object, an image pickup device, e.g., a solid state image sensor for picking up an image of the object and outputting corresponding image data, an image data amplifier and an optical shutter for the image pickup device driven to open synchronously with the active period of the stroboscopic visible light. The image data are processed to yield a picture signal which gives a clearer picture of the object on a display without generating any saturated areas wholly lacking in contrast.

DESCRIPTION OF THE PREFERRED EMBODIMENTS

Referring to FIGS. 2 to 18, the preferred embodiments of this invention will be described hereinafter in detail.

Figure 1:
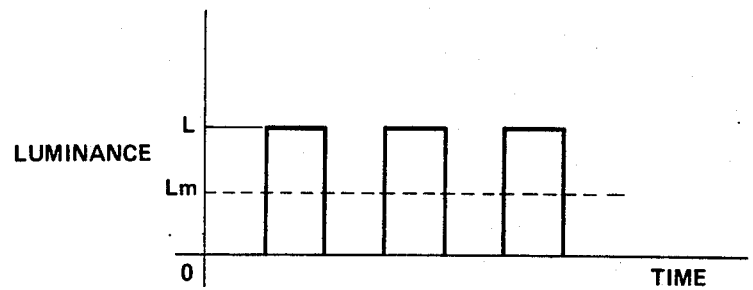
FIG. 1 is a graph illustrative of Talbot-Plateau's law underlying the present invention.
Figure 2:
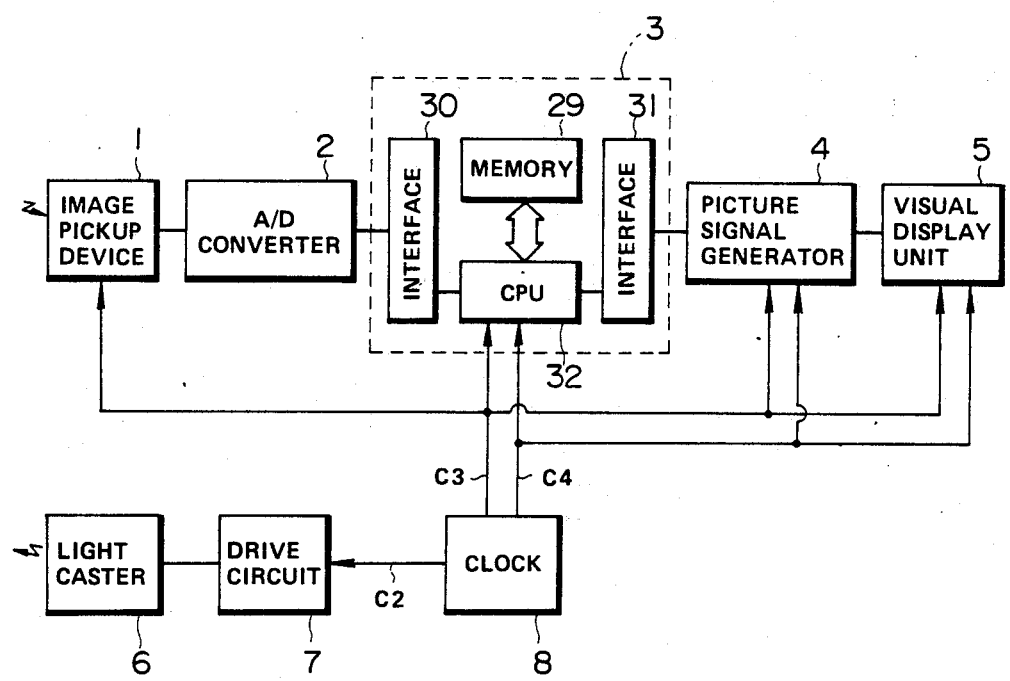
FIG. 2 is a block diagram of a first embodiment of a system for improving the visibility of objects within a visual field according to the present invention.

As shown in FIG. 2, the first embodiment of an apparatus according to this invention comprises an image pickup device 1, an A/D converter 2, an image data cumulation processor 3, a video signal generator 4, a display 5, a light caster 6, a drive circuit 7 for the light caster 6, and a clock 8.

Figure 3:
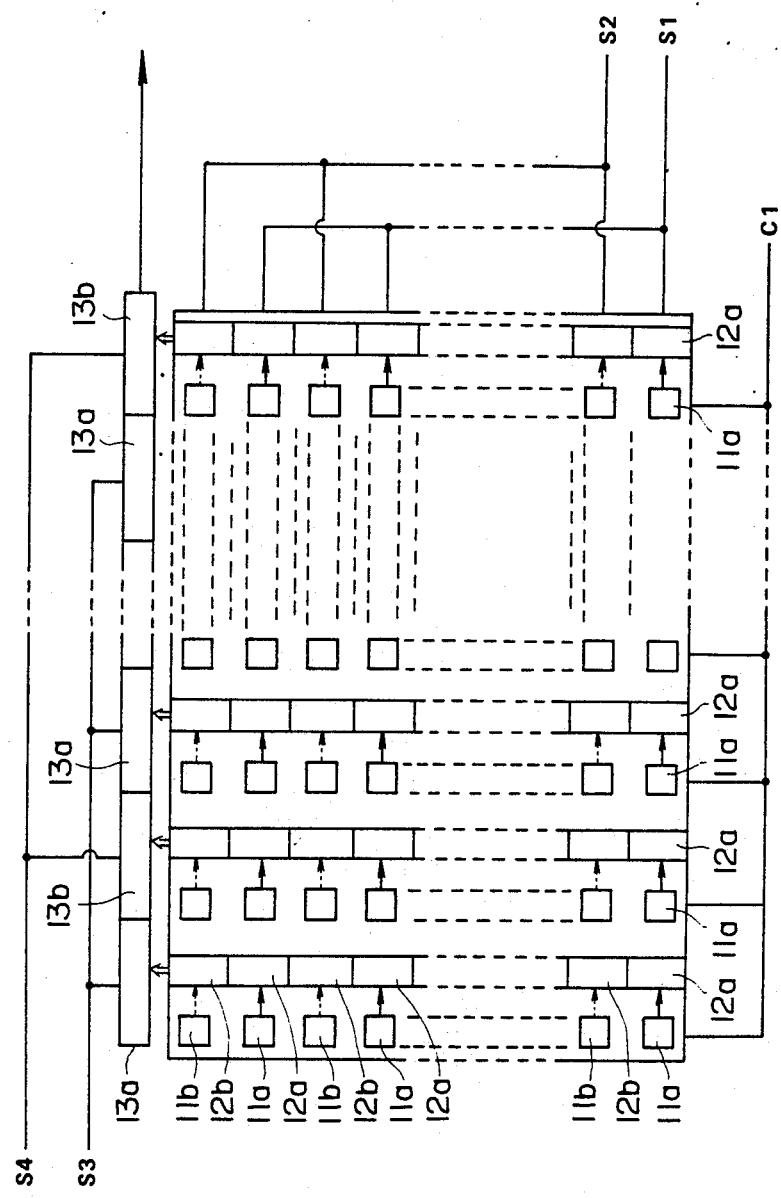
FIG. 3 is a block diagram of a CCD image sensor used as an image device in FIG. 2.

The image pickup device 1 is a solid state image sensor, e.g., a CCD image sensor such as is shown in FIG. 3, or a photomultiplier. The image pickup device 1 serves to pick up images of objects situated beyond the naked-eyes visual range of the driver of a vehicle. The CCD image sensor, as illustrated in FIG. 3, includes a number of picture elements (pixels) arranged 2-dimensionally on a light-receiving surface of the CCD image sensor. For example, there may be 78,080 pixels, i.e., 320 columns by 244 rows. Each picture element consists of a photoelectronic device 11a or 11b and a vertical shift register 12a or 12b. The photoelectronic device 11a or 11b preferably is a device effecting current amplification, e.g., a phototransistor. Alternatively, a device not effecting current amplification, e.g., a photodiode may be used in a system performing an image data cumulation.

Figure 4:
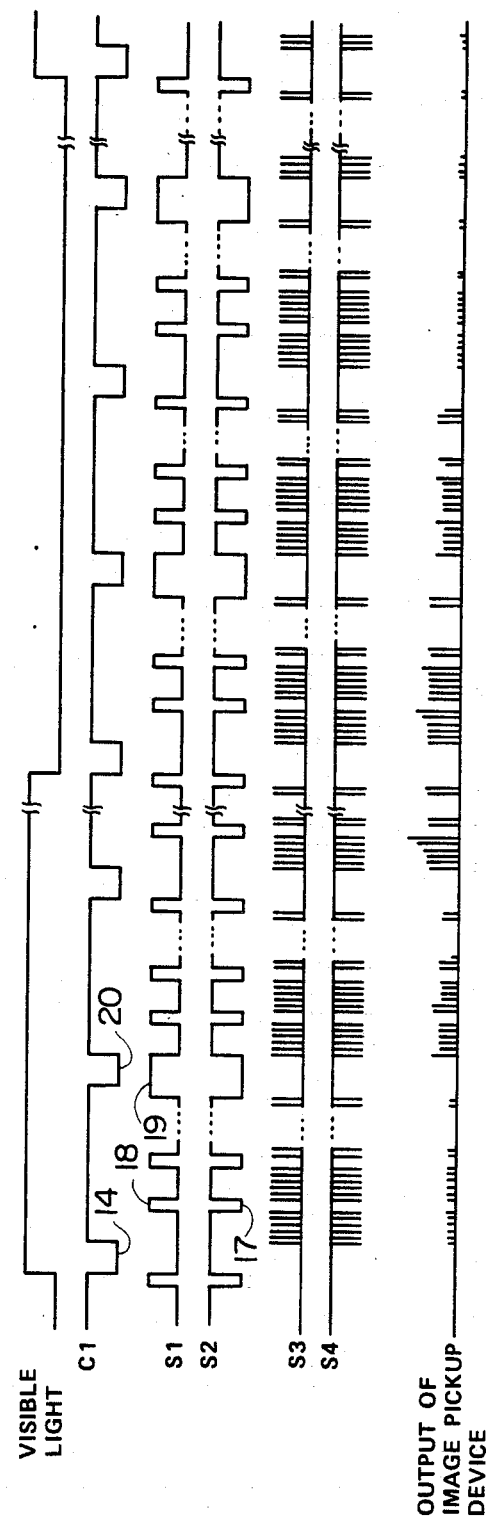
FIG. 4 is a timing chart illustrative of the operation of the CCD image sensor of FIG. 3.

A series of horizontal shift registers 13a and 13b are connected to the output ends of the 320 columns of vertical shift registers 12a and 12b. Both groups of photoelectronic devices 11a and 11b receive a write clock pulse train C1 which, when its level is low, allows the charges generated in the photoelectronic devices 11a or 11b to be transferred into the enabled vertical shift register 12a or 12b. The two groups of vertical shift registers 12a and 12b receive first and second vertical register and shift pulse trains S1 and S2 respectively consisting of register pulses and shift pulses. As shown in FIG. 4, the second vertical register and shift pulse train S2 is the logical inverse of the first vertical register and shift pulse train S1. Likewise, the two groups of horizontal shift registers 13a and 13b receive first and second horizontal register and shift pulse trains S3 and S4 respectively, which are also logical inverts. All of the different pulse trains C1, S1, S2, S3 and S4 are formed from clock pulses generated by the clock 8. At least 244 shift pulses of each of the first and second vertical register and shift pulse trains S1 and S2 occur between successive pulses of the write clock pulse train C1, corresponding to the number of the picture element rows. Likewise, at least 320 shift pulses of each of the first and second horizontal register and shift pulse trains S3 and S4 occur between successive shift pulses of the first and second vertical register and shift pulse trains S1 and S2.

The operation of the CCD image sensor of FIG. 3 will be described hereinafter in conjuction with the timing chart of FIG. 4. As shown in FIG. 4, coincident with the first (low-going) pulse 14 of the write clock pulse train C1, the voltage level of the second vertical register and shift pulse train S2 is high, thus enabling the second group of vertical shift registers 12b, the electrical charge generated in each photoelectronic device 11b is transferred into a corresponding vertical shift register 12b. At the same time, since the voltage level of the first vertical register and shift pulse train S1 is low, thus disabling the first group of vertical shift registers 12a, transfer of the electrical charge generated in each photoelectronic device 11a to the corresponding vertical shift register 12a is inhibited.

A negative shift pulse 17 of the second vertical register and shift pulse train S2 following the clock pulse 14 induces the transfer of the electrical charge stored in each vertical shift register 12b to the next vertical shift register 12a, i.e. upwards one step as viewed in FIG. 3. At the same time, a positive shift pulse 18 of the first vertical register and shift pulse train S1 shifts the electrical charge stored in each vertical shift register 12a to the next vertical shift register 12b. Thus, in response to a given number, e.g. 244, of shift pulses 17, 18, all of the picture element outputs transferred into the vertical shift registers 12a and 12b from the devices 11b are eventually transferred to the horizontal shift registers 13a and 13b. The horizontal shift registers 13a and 13b are all driven by the first and second horizontal register and shift pulse trains S3 and S4, so that the horizontal shift register 13b at the output terminal of the series of horizontal shift registers 13a and 13b eventually sends the image data cumulation processor 3 a train of 39,040 picture element outputs, i.e., the image data for one frame, with each pulse of the write clock pulse train C1 via the A/D converter 2.

Following transfer and output of the "b"-group pixel charges in response to clock pulse 14, a second clock pulse 20 falls coincident with a register pulse 19, which enables the electrical charges generated in the photoelectronic devices 11a to be transferred to corresponding each vertical shift registers 12a. Subsequent processes are performed in the same manner as for the "b"-group of photoelectronic devices and vertical shift registers. The register pulses 19 are generated synchronously with every second clock pulse 20, so that the "a" and "b" pixel rows are sampled and output alternatingly in accordance with the requirements for the interlaced raster scan of a conventional CRT display.

Thus, the CCD image sensor outputs the pulse-amplitude modulated image data for all 78,080 picture elements in a pre-arranged sequence by the time it receives the third pulse of the write clock pulse train C1. In practice, a waveforming circuit and a noise eliminating circuit are connected to the output terminal of the series of horizontal shift registers 13a and 13b. However, since these circuits are not essential to this invention, description of these circuits will be omitted.

The A/D converter 2 connected to the output terminal of the image pickup device 1 converts the train of analog picture element outputs to a corresponding digital pulse train.

Figure 5:
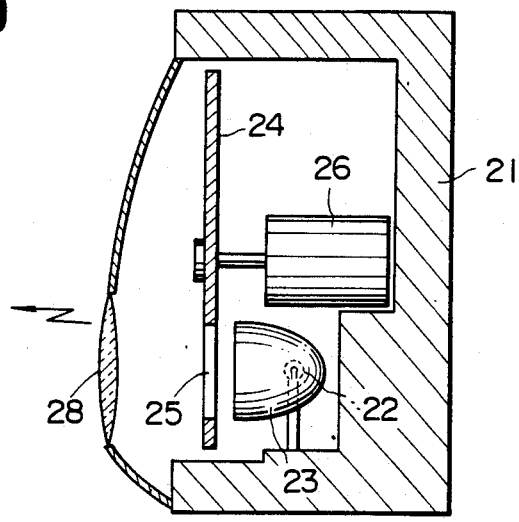
FIG. 5 is a cross-section through a light caster of FIG. 2.

The light caster 6 is designed to a cast flashes of visible light at a frequency higher than CFF (Critical Fusion Frequency). As illustrated in FIG. 5, the light caster 6 has a housing 21, a lamp 22 fixed to the housing 21 and serving as a continuous light source, a parabolic reflector 23 fixed relative to the lamp 22, a strobe disc 24 having slits 25 and disposed in front of the reflector 23, a stepping motor 26 for the strobe disc 24 driven by the drive circuit 7 at a rate determined by a clock pulse train C2 from the clock 8, a transparent cover 27 over the front of the housing 21, and a convex lens 28 fixed in the cover 27.

The light caster 6 is used as a headlight of the vehicle. The luminosity of the lamp 22, the number of slits 25 and/or the speed of rotation of the stepping motor 26 are suitably selected so as to match the range and illumination of a conventional headlight. Stroboscopic visible light reflected by any objects in the forward visual field of the vehicle falls on the image pickup device 1.

The clock 8 provides the drive circuit 7, the image pickup device 1, the image data cumulation processor 3, the video signal generator 4, and the display 5 with clock pulse trains C2, C3 and C4. The clock pulse train C2 serves to drive the stepping motor 26 as previously stated. The clock pulse train C3 is converted to a suitable frequency by frequency dividers, not shown, in the image pickup device 1, the image data cumulation processor 3, the video signal generator 4 and the display 5. For example, the clock pulse train C3 provides the base frequency for the write clock pulse train C1, the vertical register and shift pulse trains S1 and S2 and the horizontal register and shift pulse trains S3 and S4 in the image pickup device 1. Additionally the clock pulse train C3 serves as a synchronization signal for the image data cumulation processor 3, a video signal generated by the video signal generator 4, and the display 5. The clock pulse train C4 serves as a read-out pulse for a memory 29, a signal controlling a scan signal for the video signals from the video signal generator 4 (i.e., determinations of timing of vertical retrace interval and horizontal retrace interval), or a synchronization signal for the video signal between the image data cumulation processor 3 and the display 5.

The image data cumulation processor 3 will in practice be a microcomputer including an input interface 30, an output interface 31, a CPU 32 and the memory 29. The input interface 30 is connected to the A/D converter 2. The output interface 31 is connected to the video signal generator 4.

The operation of the image data cumulation processor 3 will be described in detail in conjunction with FIGS. 6 and 7. Suppose the image pickup device 1 and the display 5 have three picture elements for simplified illustration. As the light caster 6 casts the strobed visible light forward of the vehicle synchronously with the clock pulse train C2, the image pickup device 1 picks up an image of the entire forward visual field in the strobed visible light reflected by objects in the field. A pulse train made up of the digitalized picture element outputs of this image of the forward visual field, as shown in FIG. 7, is sent to the input interface 30 through the A/D converter 2.

According to this embodiment, the video signals for each frame are obtained substantially synchronously with an transmission interval of the strobed visible light (in practice, with some delay) and one memory reset pulse C4 is generated after every i video frames, where the number i is chosen to be small enough that the visual field image will remain essentially constant.

Figure 6:
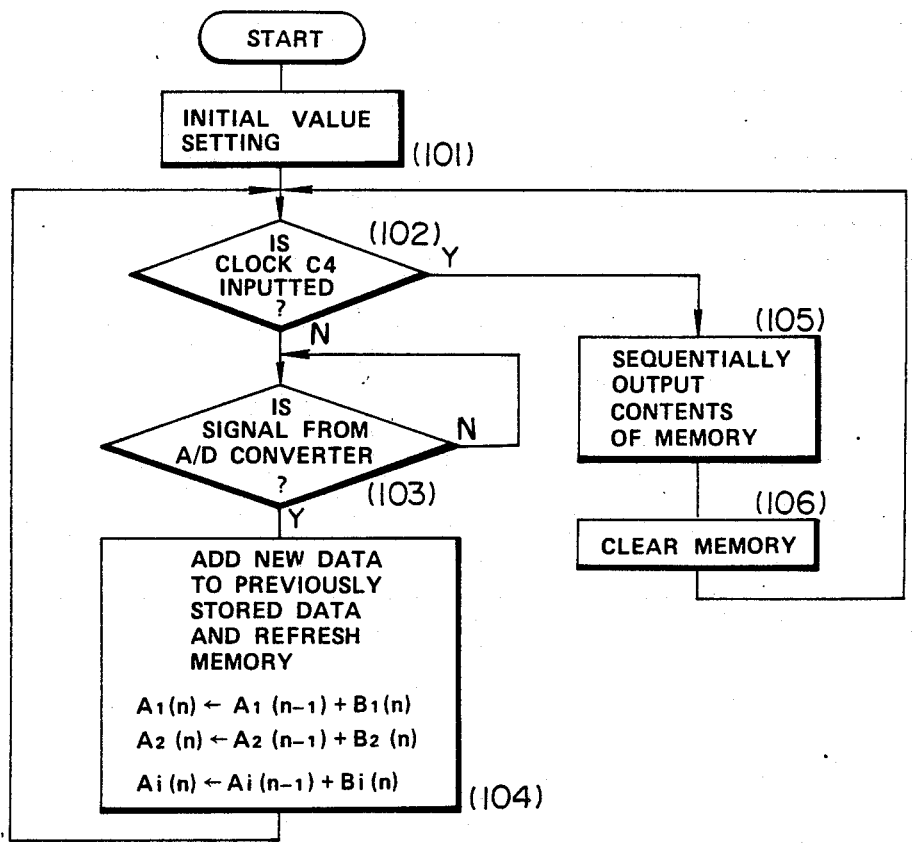
FIG. 6 is a flowchart illustrative of a image data cumulating process according to the system of FIG. 2.
Figure 7:
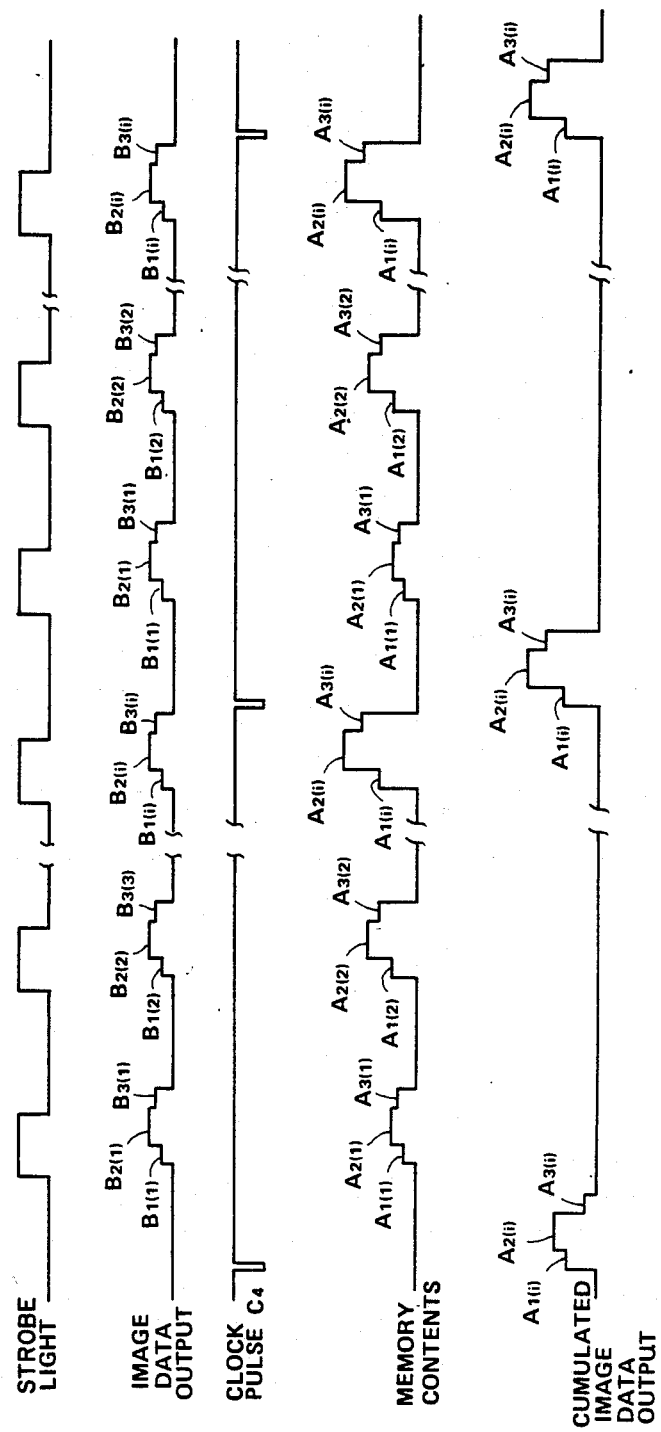
FIG. 7 is a timing chart illustrative of the image data cumulating process according to the system of FIG. 2.

As shown in FIG. 6, the image data cumulation program starts with an initialization operation at a step 101. This operation clears and allocates a memory area for the train of picture element outputs outputted from the image pickup device 1 through the A/D converter 2. Upon completion of the step 101, the program advances to a step 102. The step 102 checks for the occurrence of a clock pulse C4. In response to a clock pulse C4, the program advances to a step 105. On the other hand, in the absence of clock pulse C4, the program advances to a step 103. The operation at the step 103 checks for receipt of a picture element output at the input interface 30, in which case the program advances to a step 104. The program repeats the step 103 until the next picture element output is sent to the input interface 30.

The operation at the step 104 is as follows: each newly-received picture element output $B1(n)$, $B2(n)$, and $B3(n)$, where n represents the interval between the $(n-1)$th and nth occurrences of the reset pulse C4, are added to the integrated picture element values $A1(n-1)$, $A2(n-1)$ and $A3(n-1)$ which have been cumulated in memory prior to the $(n-1)$th occurrence of the reset pulse C4. The resulting values, i.e., the n-times-cumulated picture element values $\{Aj(n)=Aj(n-1)+Bj(n-1)\}$ are substituted for the $(n-1)$-times-cumulated values $Aj(n-1)$ stored in the memory 29, wherein $n=1, 2, 3, \ldots$ through i, representing the current sample period after the last occurrence of the reset pulse C4 and $j=1, 2$ and $3$, representing the pixels.

Upon completion of step 104, controls returns to step 102. Thus, as the program loops through the steps 102, 103 and 104, the picture element outputs at each pixel are cumulated over a given number of sample frames, e.g. i (See the 4th chart from top in FIG. 7). Upon receipt of a reset pulse C4, the program switches to the step 105 as previously stated. The step 105 outputs the cumulated picture element values to the video signal generator. The step 106 following the step 105 clears the cumulated picture element values stored in a picture element area of the memory 29. The image data cumulation processor 3 may alternatively send the video signal generator the digitalized cumulated image data after each fixed unit of distance travelled by the vehicle.

The video signal generator 4 converts the digitalized cumulated image data into video signals which drive the display 5.

The display 5 may be, for example, a CRT, especially a raster scan type CRT, or a liquid crystal display. The display 5 can display the images of the objects beyond the naked-eye visual range of the driver of the automotive vehicle. The display 5 may be suitably located near the driver seat.

Figure 9:
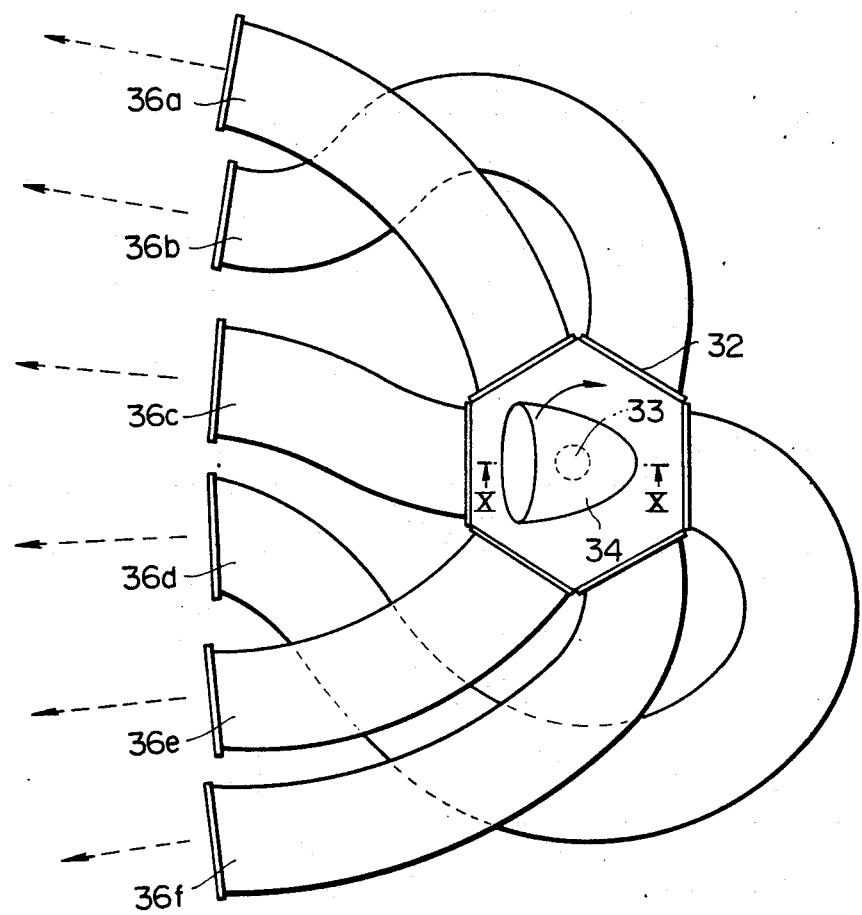
FIG. 9 is a plan view of a first modification to the light caster of FIG. 5.
Figure 10:
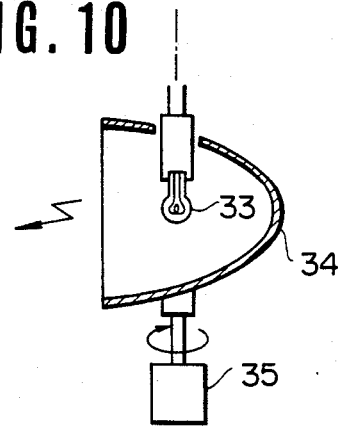
FIG. 10 is a section taken along the line X—X in FIG. 9.

A second embodiment of this invention will be described hereinafter with reference to FIGS. 8 to 10. Elements similar to those used in the first embodiment of this invention will not be discussed again. In the second embodiment, a light caster 6A casts a continuous visible light beam forward of an automotive vehicle while intermittently shifting the light beam from side to side at a switching frequency exceeding the CFF.

The light caster 6A comprises a hexagonal case 32, a lamp 33 emitting light continuously, a rotary parabolic reflector 34, a stepping motor 35 for the reflector 34 and six optical fiber bundles 36a, 36b, 36c, 36d, 36e and 36f. The hexagonal case 32 has six faces, each optically connected to the end of one of the optical fiber bundles 36a to 36f and serves to distribute the continuous visible light beam among the optical fiber bundles 36a-f. The lamp 33 is fixed to the hexagonal case 32 at the focus of the reflector 34. The reflector 34 rotates through 60° clockwise as viewed in FIG. 9 at regular intervals so that it is always directly facing the end of one of the optical fiber bundles 36a, 36b, 36c, 36d, 36e or 36f at a time. The stepping motor 35 is driven by the drive circuit 7. The output ends of the six optical fiber bundles 36a to 36f are directed forward of the vehicle and serve as cooperatively as a headlight. A group of three of the output ends of the optical fiber bundles 36a to 36c are directed slightly upwards in FIG. 9 and the other group of three optical fiber bundles 36d to 36f are directed slightly downwards in FIG. 9, that is, right and left respectively.

Changes in the operation of the image data cumulation processor 3 will be described in connection with the second embodiment of this invention in conjunction with the timing chart of FIG. 8. As the direction of the cast visible light beam changes at a frequency exceeding the CFF, the electric charge induced in each photoelectronic element 11a changes accordingly. Thus, the train of picture element outputs from the image pickup device 1 is somewhat different from that in the first embodiment of this invention, as shown on the third chart from top in FIG. 9. Assume that the image pickup device 1 and the display 5 have six picture elements.

Figure 8:
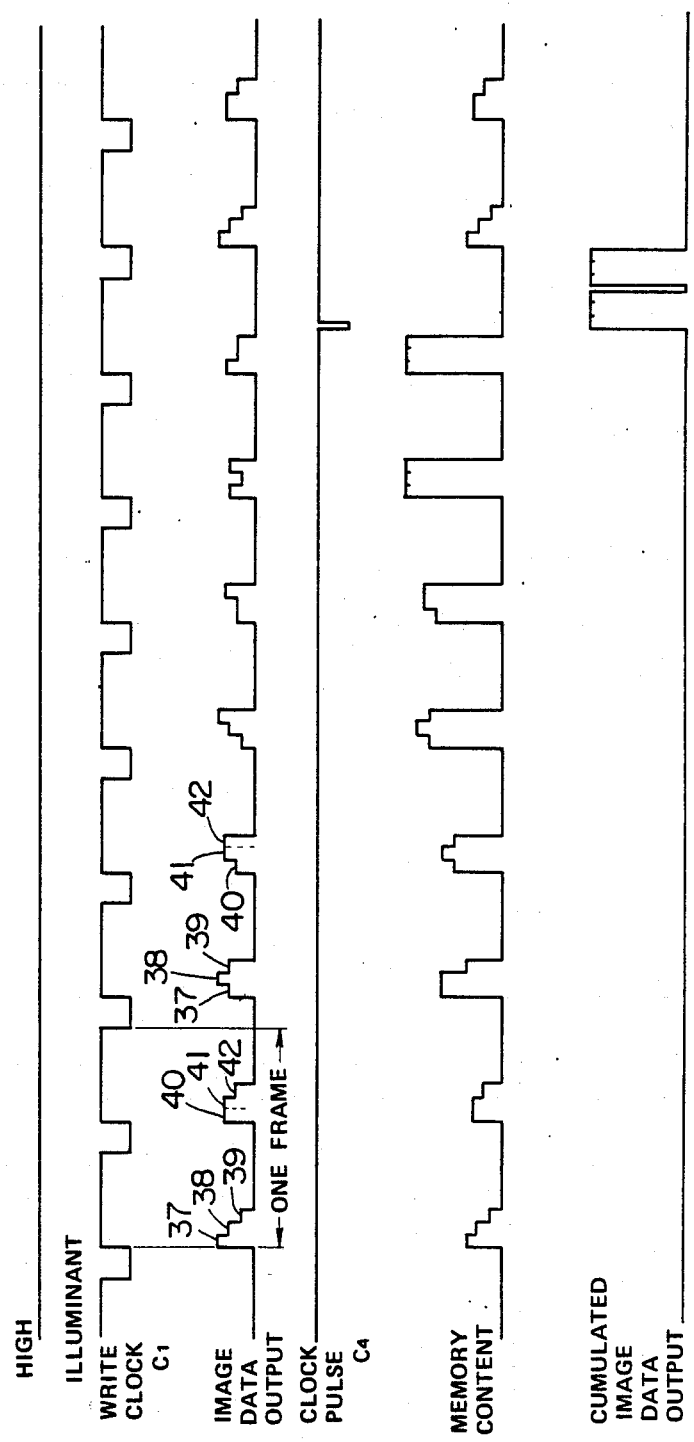
FIG. 8 is a timing chart illustrative of a image data cumulating process according to a second embodiment of a system for improving the visibility of objects within a visual field according to the present invention.

The third chart from top in FIG. 8 shows exemplary image data trains output by the image pickup device 1, each consisting of three picture element output. The first image data train consists of a first high-level picture element output 37, a third intermediate-level picture element output 38 and a low-level fifth picture element output 39. The second image data train consists of a second high-level picture element output 40 at a level higher than the intermediate level but lower than the high level in the first image data train, a fourth picture element output 41 at a level equal to that of the second picture element output 40, and a sixth picture element output 42 at a level higher than the low level but lower than the immediate level in the first image data train.

The third image data train is an updated version of the first image data train. The first picture element output 37 drops to the intermediate level of the first image data train, the third picture element output 38 rises to the high level of the first image data train, and the fifth picture element output 39 rises to the intermediate level of the first image data train.

The fourth image data train similarly corresponds to the second image data train. The second picture element output 40 drops to the low level of the second image data, the fourth picture element output 41 remains high, and the sixth picture element output 42 rises to the high level of the second image data.

Changes in the levels of the first, third and fifth picture element outputs 37, 38 and 39 will tend to match those of the second, fourth and sixth picture element outputs 40, 41 and 42 in successive image data trains. As shown on the fifth chart from top in FIG. 8, the two group of picture element outputs are cumulated over about four frames, and then are cleared in response to a reset pulse C4.

The reset pulse period is equal to the period in which the light beam switches between optical fiber bundles 36a-f. In response to the reset pulse C4, the image data cumulation processor 3 sends the digitalized cumulated image data to the video signal generator 4 (See the chart at bottom in FIG. 8) and clears the contents of the memory 29.

In the second embodiment of this invention, the scanning light beam enhances the absolute luminosity in the forward visual field of the vehicle so as to yield a clearer picture on the screen of the display 5 than in the first embodiment.

Figure 11:
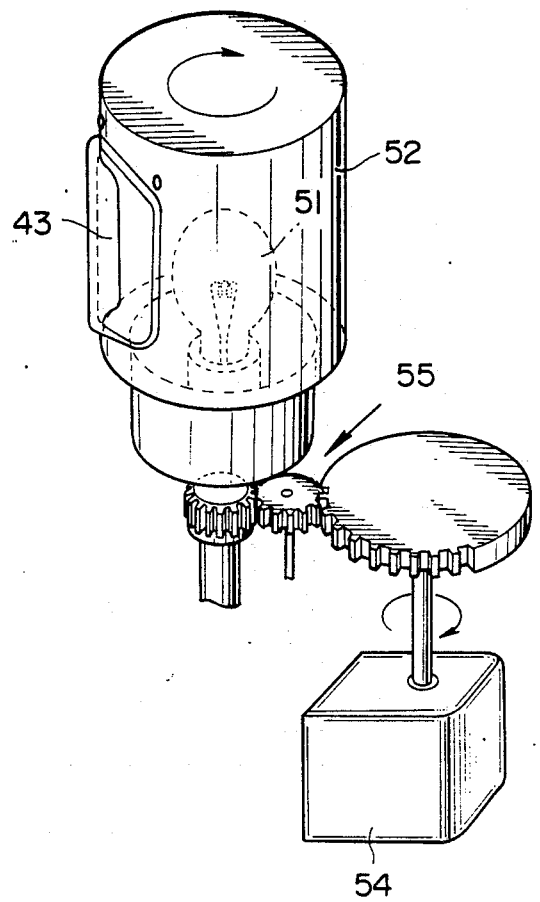
FIG. 11 is a perspective view of a second modification to the light caster of FIG. 5.

FIG. 11 illustrates a second modification to the light caster 6. The light caster comprises a fixed lamp 51 emitting light continuously, a rotary cylindrical reflector 52 having a transparent window 53, a stepping motor 54, and speed-up gears 55. The stepping motor 54 rotates the reflector 52 by means of the speed-up gears 55.

Figure 12:
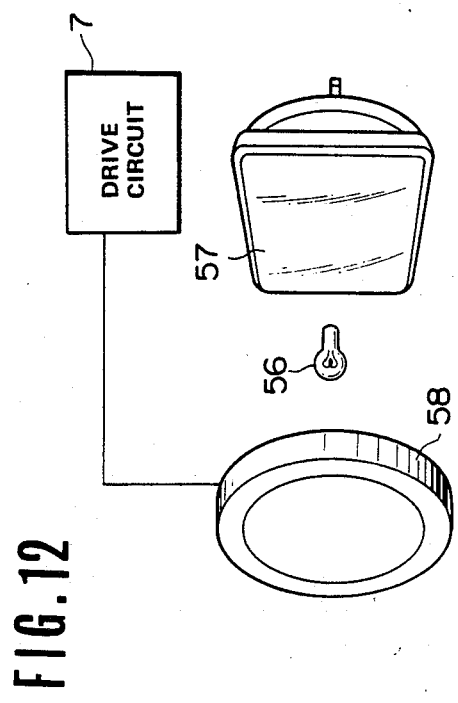
FIG. 12 is a diagram of a third modification to the light caster of FIG. 5.

FIG. 12 illustrates a third modification to the light caster 6. The light caster comprises a fixed lamp 56 emitting light continuously, a parabolic reflector 57 and an electromagnetic shutter 58 in front of the lamp 56. The shutter 58 is driven by the drive circuit 7 and opens and shuts at a frequency not less than CFF in response to a timing signal from the clock 8. This modification obviates the need for a rotary driver.

Figure 13:
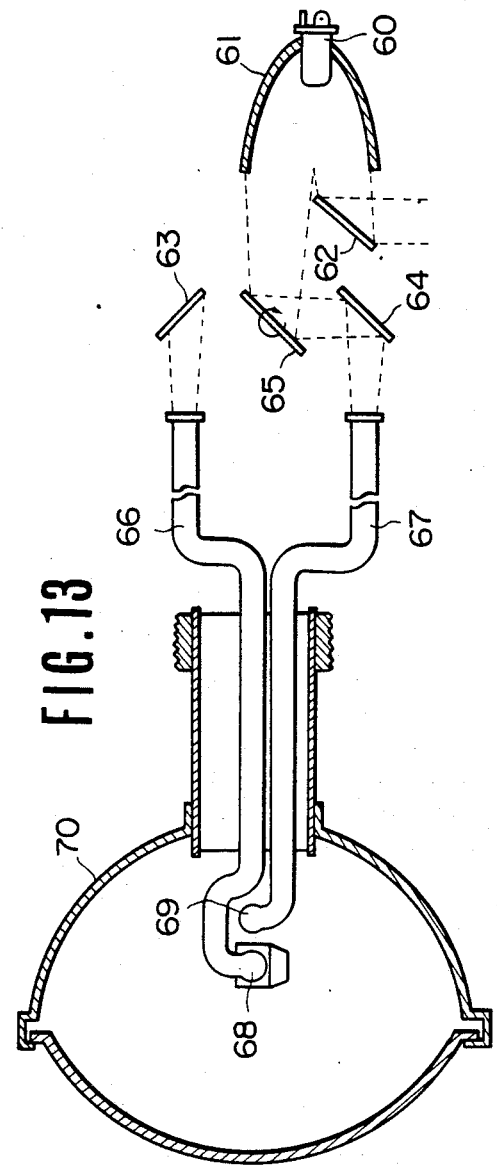
FIG. 13 is a schematic section of a fourth modification to the light caster of FIG. 5.

FIG. 13 illustrates a fourth modification to the light caster 6. The light caster is a combined dimbeam headlight and cruising headlight and comprises a fixed lamp 60 emitting light continuously, a fixed parabolic reflector 61 focussed on the lamp 60, four mirrors 62, 63, 64 and 65, a first optical fiber 66 for the dimmer headlight, a second optical fiber 67 for the brighter headlight, a dim-beam headlight 68 in the form of a spherical lens, a crusing headlight 69 in the form of a spherical lens, a headlight reflector 70 and a front glass cover 71 for the headlight reflector 70. The mirror 62 is a fixed 90°-reflecting mirror facing the lower part of the reflector 61 in FIG. 13. The mirror 62 deflects half of the light from the reflector 61 to the other headlight system, not shown, e.g., the left-hand headlight system. As the mirror 65 rotates clockwise as viewed in FIG. 13, its opposite surfaces alternatingly reflect the light from the reflector 61 toward one of the mirrors 63 and 64. These latter mirrors 63, 64 are fixed 90°-reflecting mirrors and inject light from the mirror 65 into the corresponding first or second optical fiber 66 or 67. The dim-beam headlight 68 and the cruising headlight 69 are situated at or near the focus of the headlight reflector 70. In this modification, the rotary mirror 65 alternates between the dim-beam and high-beam headlights at a frequency not less than CFF.

According to this modification, the lamp 60 can be located arbitrarily, so that replacement of the lamp 60 can be facilitated.

Referring to FIGS. 14 to 17, a third embodiment of this invention will be described hereinafter. Description of elements similar to those used in the first embodiment of this invention will not be repeated.

Figure 14:
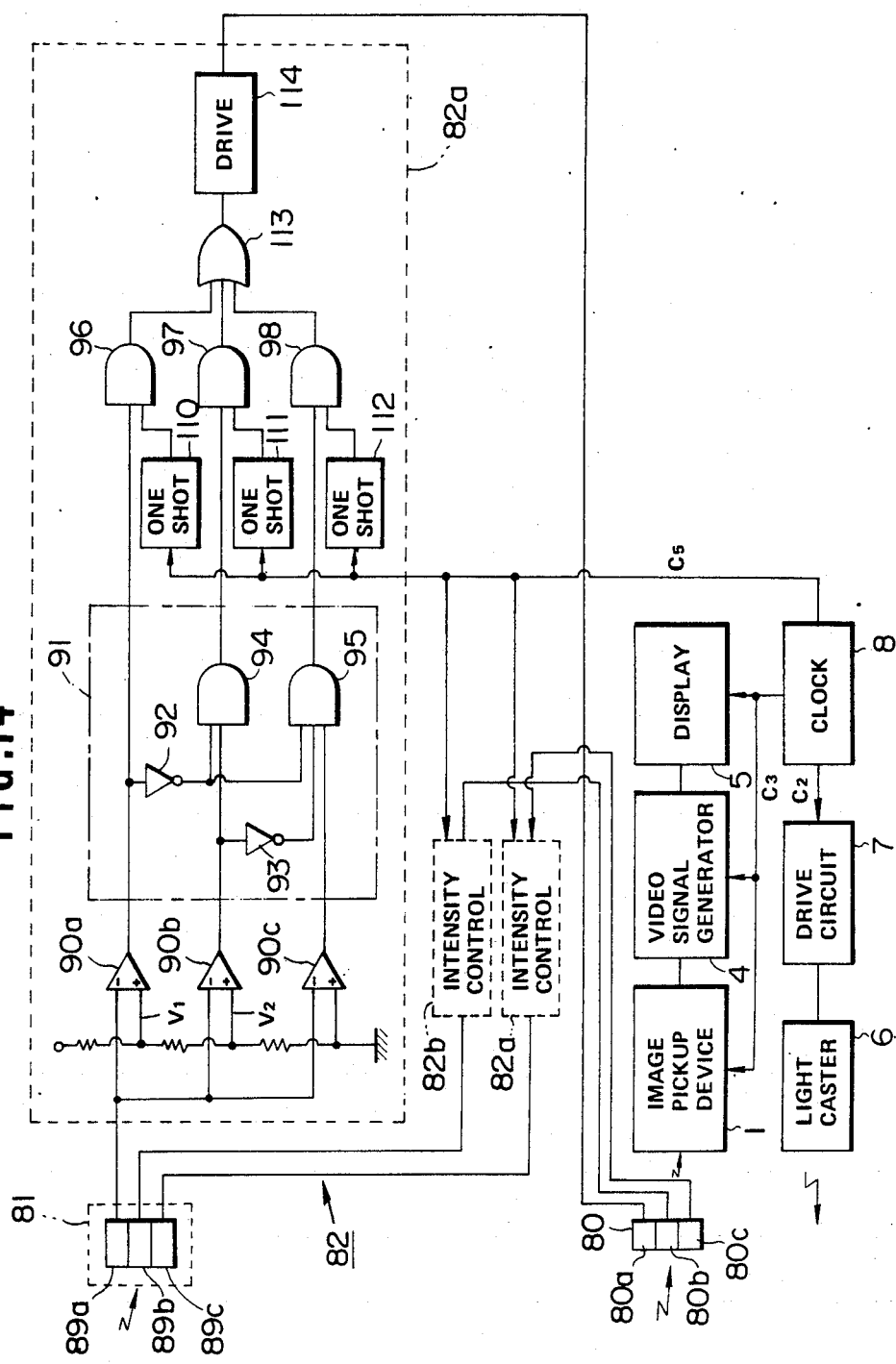
FIG. 14 is a block diagram of a third embodiment of a system for improving the visibility of objects within a visual field according to the present invention.

As shown in FIG. 14, the third embodiment of an apparatus according to this invention comprises an image pickup device 1, an A/D converter, not shown, connected to an output terminal of the image pickup device 1, a video signal generator 4, a display 5, a light caster 6, a drive circuit 7 for the light caster, a clock 8, a liquid crystal shutter 80, a light-intensity sensor 81 and a transmitted light-intensity controller 82. This apparatus lacks the image data cumulation processor used in the first and second embodiments of this invention. Stroboscopic visible light cast by the light caster 6 is reflected by objects within the forward visual field of a vehicle and then enters the image pickup device 1 via the liquid crystal shutter 80 and the light intensity sensor 81.

Figure 15:
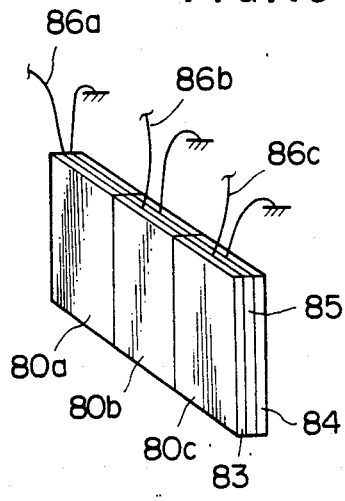
FIG. 15 is a perspective view of the liquid crystal shutter of FIG. 14.

The liquid crystal shutter 80 consists of three liquid crystal panels 80a, 80b and 80c arranged laterally across the vehicle. The liquid crystal panels 80a, 80b and 80c are connected to output terminals of respective transmitted light-intensity control circuits 82a, 82b and 82c of the transmitted light-intensity controller 82. As illustrated in FIG. 15, each of the liquid crystal panels 80a, 80b and 80c is composed of two transparent glass panels 83 and 84 and a hollow spacer 85 disposed between the glass panels 83 and 84. Each glass panel 83 or 84 has a transparent electrode, not shown, on its inner surface. A pair of the electrodes is connected to a voltage terminal 86a, 86b or 86c. Each pair of electrodes of the liquid crystal panels 80a, 80b and 80c is independent of others. The spacer 85 contains a field-effect liquid crystal within its hollow interior. A drive voltage applied to the voltage terminal 86a, 86b or 86c changes the light transmissivity of the corresponding liquid crystal panel 80a, 80b or 80c.

Figure 16:
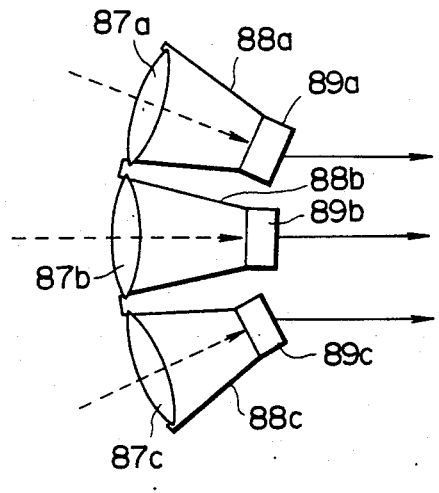
FIG. 16 is an illustration of a light intensity detector of FIG. 14.

The light intensity sensor 81, as illustrated in FIG. 16, comprises three convex lenses 87a, 87b and 87c, three camera cones 88a, 88b and 88c each supporting the lenses 87a, 87b and 87c, and three photoelectronic devices 89a, 89b and 89c each disposed in the focal planes of the lenses 87a, 87b and 87c. Each of the photoelectronic devices 89a, 89b and 89c is a current amplification device, e.g., a phototransistor. Some of the light incident on the liquid crystal panels 80a, 80b and 80c enters each of the lenses 87a, 87b and 87c. The output of each of the photoelectronic devices 89a, 89b and 89c is sent to a corresponding transmitted light-intensity control circuit 82a, 82b or 82c.

The transmitted light-intensity controller 82 will be described in conjunction with FIG. 14. Since the transmitted light-intensity control circuits 82a, 82b and 82c are identical, only the first transmitted light-intensity control circuit 82a will be described. The transmitted light-intensity control circuit 82a comprises a high-level comparator 90a, an intermediatelevel comparator 90b and a zero-level comparator 90c which cooperate to divide the output range of the photoelectronic device 89a into three stages respectively lower-bounded by the high reference voltage $V_1$, an intermediate reference voltage $V_2$ and a zero reference voltage. The outputs of the comparators 90a, 90b and 90c are processed by a decoder 91 which comprises two inverters 92 and 93 and two AND gates 94 and 95. The outputs of the decoder 91 are applied to AND gates 96, 97 and 98 as gate signals. The output of a first one-shot multivibrator 110 is applied to the AND gate 96, the output of a second one-shot multivibrator 111 is applied to the AND gate 97 and the output of a third one-shot multivibrator 112 is applied to the AND gate 98. All of the outputs of the one-shot multivibrators 110, 111 and 112 are synchronous with a clock pulse C5 from the clock 8 and the transmission interval of the strobed visible light. The first one-shot multivibrator 110 outputs a pulse with a narrow width, the second one-shot multivibrator 111 outputs a pulse with an intermediate width and the third one-shot multivibrator 112 outputs a relatively wide pulse. The outputs of all of the AND gates 96, 97 and 97 are applied to an OR gate 113, the output of which is conducted to a drive circuit 114. The output of the drive circuit 114 is provided to the voltage terminal 86a of the first liquid crystal panel 80a.

Figure 17:
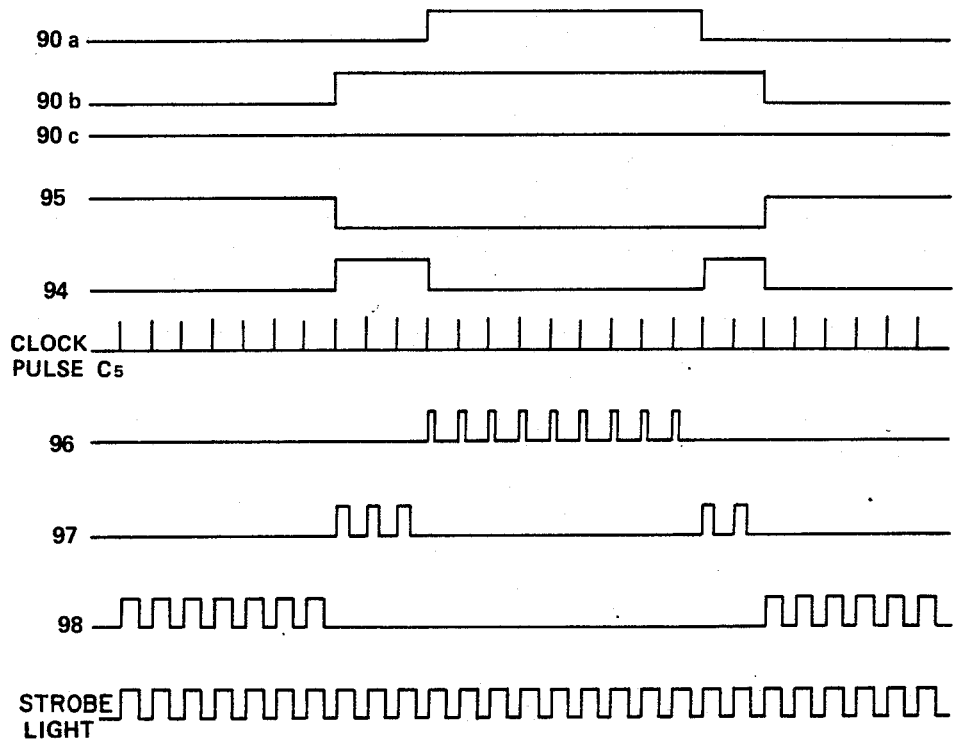
FIG. 17 is a timing chart illustrative of the operation of the system of FIG. 14.

As shown on the first, second and third charts of FIG. 17, as the light intensity at the photoelectronic device 89a increases with time, first the output of the intermediate-level comparator 90b steps up and then the output of the high-level comparator 90a steps up, and then as the light intensity at the photoelectronic device 89a decreases with time, first the output of the high level comparator 90a steps down and then the output of the intermediate level comparator 90b steps down. The output level of the zero level comparator 90c remains high throughout.

The AND gate 98 outputs wide pulses until the output of the intermediate-level comparator 90b goes high. The AND gate 97 outputs intermediate-width pulses starting in response to the rising edge of the output of the intermediate-level comparator 90b and ending in response to the rising edge of the output of the high-level comparator 90a or the trailing edge of the former signal. The AND gate 96 outputs narrow pulses as long as the output of the high level comparator 90a remains high. Thus, as the intensity of incident light on the liquid crystal panel 80a rises, the duty cycle of the liquid crystal panel 80a drops so as to reduce its effective transmissivity. The transmitted light intensity control circuits 82b and 82c operate in the same manner as the transmitted light intensity control circuit 82a. For example, in cases where a vehicle in the opposite lane casts a very intense beam toward regions within the forward visual field of one's own vehicle corresponding to one of the crystal panels 80a, 80b or 80c, that liquid crystal panel would reduce its effective transmissivity, thus preventing "blooming" in the solid state pickup image sensor and the display. The digitalized picture element outputs are applied directly to the video signal generator 4 without any image data cumulation processing.

Figure 18:
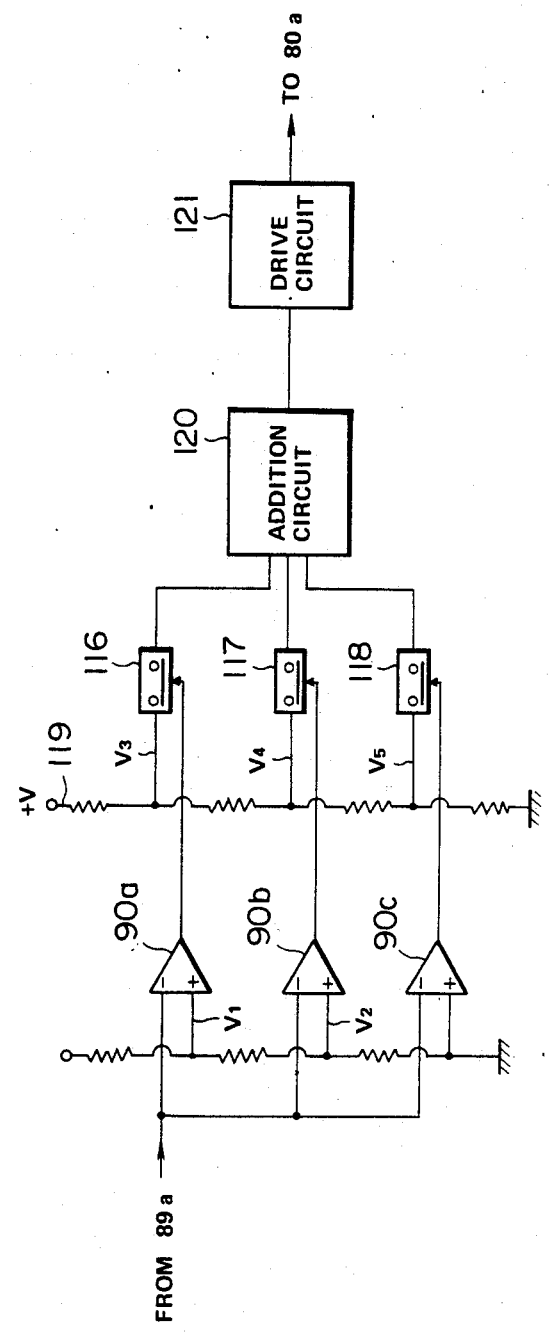
FIG. 18 is a diagram of a modification to the transmitted light intensity control circuit of FIG. 14.

FIG. 18 shows a modification to the transmitted light intensity control circuits 82a, 82b and 82c. This modification is designed to adjust the drive voltage of the liquid crystal panels 80a, 80b or 80c to any of three levels. The output of the comparator 90a is applied to the ON-OFF control terminal of a high-level analog switch 116, the output of the comparator 90b is applied to the ON-OFF control terminal of an intermediate-level analog switch 117 and the output of the comparator 90c is applied to the ON-OFF control terminal of a low-level analog switch 118. The input terminal of the high-level analog switch 116 receives a high drive voltage $V_3$ via a resistor voltage divider 119. The input terminal of the intermediate-level analog switch 117 receives an intermediate drive voltage $V_4$ via the resistor voltage divider 119. The input terminal of the low-level analog switch 118 receives a low drive voltage $V_5$ via the resistor voltage divider 119. All of the drive voltages $V_3$, $V_4$ and $V_5$ are higher than the reference voltages $V_1$ and $V_2$. All of outputs of the analog switches 116, 117 and 118 are applied to an addition circuit 120. The output of the addition circuit 120 is applied to the drive circuit 121 for the liquid crystal shutter 80.

The addition circuit 120 outputs an analog voltage at one of three different levels in accordance with the output of the photoelectronic device 89a. The drive circuit 121 amplifies the analog voltage and sends it to the liquid crystal panel 80a. Alternatively, the addition circuit 120 may be eliminated.

This modification to the transmitted light intensity control circuit allows adjustment of the instantaneous phototransmissivity of each liquid crystal panel 80a, 80b or 80c among three levels.

In the third embodiment of this invention, when the strobed visible light from the light caster 6 is off, all of the liquid crystal panel 80a, 80b and 80c are opaque and on the other hand, when the strobed visible light from the light caster 6 is on, each of the liquid crystal panels 80a, 80b and 80c adjusts its duty cycle or proper transmissivity in response to the intensity of received light. However, a liquid crystal shutter which always is open when the strobed visible light from the light caster 6 is on, but not when this light is off can shield the solid state image pickup sensor from optical noise including the high-beam headlights of a vehicle in the opposite lane, so that adverse loss of contrast in the picture on the display 5 can be sufficiently prevented.

According to another embodiment of this invention, the output of each photoelectronic device of the light intensity sensor is amplified and applied to each liquid crystal panel with a suitable synchronous signal so that the liquid crystal panel can proportionally adjust its transmissivity in accordance with the intensity of received light.

According to further embodiment of this invention, the light caster is used as an auxiliary front light rather than as a headlight.

According to yet another embodiment of this invention, the headlight intensity can be controlled stepwise from 10 to 100%.

What is claimed is:

1. An apparatus comprising:
   means for casting visible light toward a reflective object at a frequency of no less than the critical fusion frequency;
   means for picking up an image of the object and outputting image data in accordance with the picked-up image;
   a light-intensity sensor monitoring the intensity of a light incident on said image pickup means and outputting a signal representing the level of the intensity of the incident light;
   an optical shutter of liquid crystal filtering the incident light;
   a light-intensity control circuit opening and shutting said optical shutter in accordance with the frequency of the casting of the visible light and controlling a duty cycle of said optical shutter in response to a level of said signal so as to control an effective transmissivity of said optical shutter;
   means for generating a picture signal in accordance with the image data; and
   means for displaying a picture of the object in response to the picture signal.

2. An apparatus as recited in claim 1, wherein said light casting means includes means for generating a flashing visible light.

3. An apparatus as recited in claim 1, wherein said display means is a raster scan-type cathode ray tube.

4. An apparatus as recited in claim 1, wherein the light-intensity control circuit includes a circuit categorizing the level of light intensity among a plurality of levels and a plurality of one-shot multivibrators which output pulses with unique widths monotonically related to the categorized light intensity, the output pulse serving to control the open period of the optical shutter.

5. An apparatus as recited in claim 1, wherein the light-intensity control circuit includes a circuit for dividing an output range of the level of light intensity among a plurality of levels and a circuit adjusting the transmissivity of the liquid crystal shutter in response to the output of the level-dividing circuit.

6. An apparatus as recited in claim 1, wherein the liquid crystal shutter is of the field-effect type.

7. An apparatus as recited in claim 1, further comprising an optical shutter for said image pickup means driven to open synchronously with the intervals of transmission of visible light and wherein said visible light casting means casts visible light stroboscopically at said frequency.

8. An apparatus as recited in claim 1, wherein said image pickup means comprises a solid state image sensor which includes a photoelectronic device.

9. An apparatus as recited in claim 8, wherein the photoelectronic device has an amplified output.

10. An apparatus as recited in claim 9, wherein the solid state image sensor is a CCD image sensor.

11. An apparatus as recited in claim 9, wherein the photoelectronic device is a phototransistor.

12. A process comprising the steps of:
    casting visible light toward a reflective object at a frequency no less than the critical fusion frequency;
    picking up an image of the object;
    outputting image data in accordance with the image;
    monitoring the intensity of an incident light in said image pickup step and outputting a signal representing the level of the intensity of the incident light;
    filtering the incident light by means of an optical shutter;
    opening and shutting the optical shutter in accordance with the frequency of the casting of visible light and controlling the duty cycle of said optical shutter in response to a level of said signal so as to control an effective transmissivity of said optical shutter;
    generating a picture signal in accordance with the image data; and
    displaying a picture of the object in response to the picture signal.

13. An apparatus for improving the visibility of an object within a visual field of a vehicle comprising:
    a light caster casting visible light toward a reflective object within the visual field stroboscopically at a frequency no less than critical fusion frequency;
    means for picking up an image of the object and outputting image data;
    a light intensity sensor sensing the intensity of a light incident on said image pickup means and for outputting a signal representing the level of the intensity of the incident light;
    an optical shutter for said image pickup means driven to open synchronously with the intervals of transmission of the strobed visible light;
    a light-intensity control circuit driving said optical shutter and controlling the duty cycle of said optical shutter in response to a level of said signal so as to control an effective transmissivity of said optical shutter;
    a picture signal generator outputting a picture signal in accordance with the image data; and
    a display presenting a picture of the object in response to the picture signal.

14. An apparatus as recited in claim 13, wherein the optical shutter is divided into a plurality of elements arranged laterally across the vehicle.

15. An apparatus comprising:
    means for casting visible light toward a reflective object at a frequency no less than the critical fusion frequency;
    means for picking up an image of the object and outputting image data in accordance with the picked-up image;
    a light intensity sensor monitoring the intensity of a light incident on said image pickup means and outputting a signal representing the level of the intensity of the incident light;

an optical shutter of a field-effect type liquid crystal filtering the incident light;

a light-intensity control circuit analogically controlling a drive voltage of the field-effect type liquid crystal in response to a level of said signal so as to control an instantaneous transmissivity of said optical shutter;

means for generating a picture signal in accordance with the image data; and means for displaying a picture of the object in response to the picture signal.

16. An apparatus as recited in claim 15, wherein said light-intensity control circuit includes a circuit for dividing an output range of the level of light intensity among a plurality of levels and a circuit analogically controlling the drive voltage of the field-effect type liquid crystal in response to an output of the level-dividing circuit.

* * * * *